United States Patent
Chinomi

(10) Patent No.: US 7,684,593 B2
(45) Date of Patent: Mar. 23, 2010

(54) DRIVING SUPPORT SYSTEM AND METHOD OF PRODUCING OVERHEAD VIEW IMAGE

(75) Inventor: Satoshi Chinomi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 881 days.

(21) Appl. No.: 11/256,533

(22) Filed: Oct. 24, 2005

(65) Prior Publication Data

US 2006/0088190 A1    Apr. 27, 2006

(30) Foreign Application Priority Data

Oct. 25, 2004    (JP) .............................. 2004-309590

(51) Int. Cl.
G06K 9/00    (2006.01)
(52) U.S. Cl. ..................................... 382/104
(58) Field of Classification Search ......... 382/103–107; 340/907–950; 348/112–120; 345/619–689
See application file for complete search history.

(56) References Cited

U.S. PATENT DOCUMENTS

| | | | |
|---|---|---|---|
| 6,912,001 B2 * | 6/2005 | Okamoto et al. | 348/222.1 |
| 7,058,207 B2 | 6/2006 | Iida et al. | |
| 2002/0110262 A1 | 8/2002 | Iida et al. | |
| 2003/0076414 A1 * | 4/2003 | Sato et al. | 348/148 |
| 2003/0179293 A1 * | 9/2003 | Oizumi | 348/148 |
| 2004/0056950 A1 | 3/2004 | Takeda | |
| 2004/0184638 A1 * | 9/2004 | Nobori et al. | 382/104 |

FOREIGN PATENT DOCUMENTS

| | | |
|---|---|---|
| EP | 1 065 642 A2 | 1/2001 |
| EP | 1 168 248 A2 | 1/2002 |
| EP | 1 179 958 A1 | 2/2002 |
| EP | 1 197 937 A1 | 4/2002 |
| EP | 1 231 110 A2 | 8/2002 |
| EP | 1 303 140 A1 | 4/2003 |
| EP | 1 407 931 A1 | 4/2004 |
| JP | 2001-315603 A | 11/2001 |
| JP | 2002-125224 A | 4/2002 |
| JP | 2002-199257 A | 7/2002 |
| JP | 2002-314991 A | 10/2002 |
| JP | 2003-067735 A | 3/2003 |

(Continued)

OTHER PUBLICATIONS

U.S. Appl. No. 11/822,352, filed Jul. 5, 2007, Kanaoka et al.

(Continued)

Primary Examiner—Samir A. Ahmed
Assistant Examiner—Atiba O Fitzpatrick
(74) Attorney, Agent, or Firm—Foley & Lardner LLP

(57) ABSTRACT

A driving support system which includes: at least two cameras to take images of areas around a vehicle, whose ranges of field of view partially overlap with each other; a control unit performing a predetermined coordinate transformation on the images taken by the cameras and joining the transformed images together to produce an overhead view image; and a display unit to display the overhead view image. The control unit changes the position of the joint of the transformed images in the overhead view image.

15 Claims, 9 Drawing Sheets

FOREIGN PATENT DOCUMENTS

| | | |
|---|---|---|
| JP | 2003-132349 A | 5/2003 |
| JP | 2003-169323 A | 6/2003 |
| JP | 2004-026012 A | 1/2004 |
| JP | 2004-240480 A | 8/2004 |
| JP | 2004-274114 A | 9/2004 |
| WO | WO 03/107067 A2 | 12/2003 |

OTHER PUBLICATIONS

U.S. Appl. No. 11/997,515, filed Jan. 31, 2008, Yanagi.

U.S. Appl. No. 12/354,201, filed Jan. 15, 2009, Kanaoka et al.

Shi-Xue Lu et al., "Real-time Detecting and Warning System of Lightning in Guangxi", Journal of Guangxi Meteorology, vol. 24, No. 2 (2003), pp. 46-48.

* cited by examiner

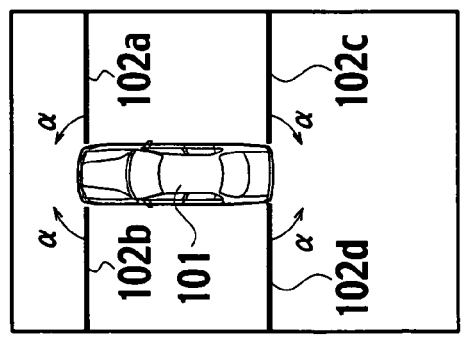
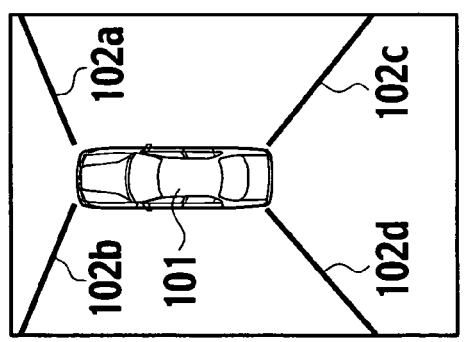
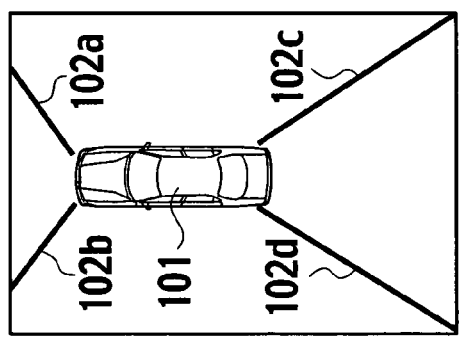
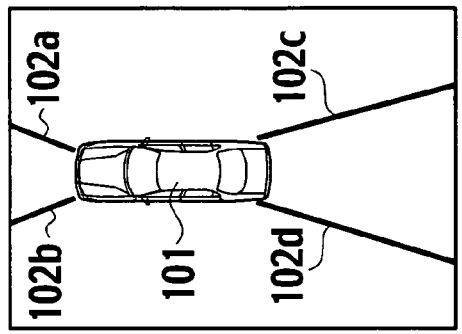
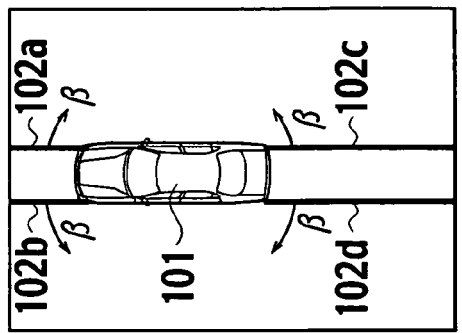

DRIVING SUPPORT SYSTEM AND METHOD OF PRODUCING OVERHEAD VIEW IMAGE

BACKGROUND OF THE INVENTION

1. Field of the Invention

The present invention relates to a driving support system and a method of producing an overhead view image.

2. Description of Related Art

Japanese Patent Application Laid-open Publication No. 2002-125224 discloses a driving support system providing a driver with a virtual image of areas around a vehicle as viewed from a virtual viewpoint located above the vehicle (hereinafter referred to as "overhead view image"). In the system, a plurality of cameras are installed on the vehicle to take images of areas around the vehicle, each of which is processed and transformed to a component image of the overhead view image. The overhead view image is a synthesized image of the component images and a plan view image of the vehicle, presenting the driver with visual information on the vehicle position relative to a marker line of a parking space or a kerb when parking or pulling over to the kerb.

SUMMARY OF THE INVENTION

In the above-mentioned driving support system, the images taken by the cameras are subjected to coordinate transformation from a camera coordinate system to a virtual-viewpoint coordinate system to produce the component images of the overhead view image, in which the points of the images taken by the cameras are transformed to a predetermined reference plane (for example, a road surface). Accordingly, a two-dimensional object lying on the reference plane can be transformed with its continuity maintained at a joint of the component images, however a three-dimensional object having a part positioning above and below the reference plane may be discontinuous at the joint of the component images.

Further, a three-dimensional object being several tens of centimeters wide may not be appeared on the overhead view image due to masking on a region along the joint of the component images or misalignment of the camera, notwithstanding that there is actually the three-dimensional object in a position corresponding to the joint.

The present invention has been made in the light of the foregoing problems. An object of the present invention is to provide a driving support system and a method of producing an overhead view image, capable of suppressing degradation of image quality attributed to the discontinuity in a synthesized image.

An aspect of the present invention is a driving support system comprising: a plurality of image taking devices taking images of areas around a vehicle, having ranges of field of view partially overlapping with each other; an image processing unit performing a predetermined coordinate transformation on the images taken by the image taking devices to produce transformed images and joining the transformed images to each other at a joint to produce a virtual image viewed from a virtual viewpoint, wherein the image processing unit can change position of the joint in the virtual image; and a display unit displaying the virtual image.

Another aspect of the present invention is a method of producing a virtual image to be displayed in a driving support system, comprising: taking images of areas around a vehicle partially overlapping with each other; performing a predetermined coordinate transformation on the taken images to produce transformed images; and joining the transformed images together at a joint on a position in the virtual image changed from a previous position thereof.

BRIEF DESCRIPTION OF THE DRAWINGS

The invention will now be described with reference to the accompanying drawings wherein:

FIGS. 3A and 3B show ranges of field of view of the second and fourth cameras $10_2$ and $10_4$, respectively. FIG. 3C shows an area where the ranges of field of view of the second and fourth cameras $10_2$ and $10_4$ overlap with each other.

FIG. 7A shows one example before the change, and FIG. 7B after the change.

FIG. 8A to 8E show that the positions of the joints of transformed image are continuously changed. FIGS. 8A to 8E show the first to fifth examples of the positions of the joints, respectively.

FIG. 9A shows an example of an overhead view image before the positions of the joints are changed, FIG. 9B while the positions thereof being changed, and FIG. 9C after changed.

FIG. 10A shows an example of an overhead view image before the positions of the joints are changed, FIG. 10B while the positions thereof being changed, and FIG. 10C after changed.

DETAILED DESCRIPTION OF THE PREFERRED EMBODIMENT

Figure 1:
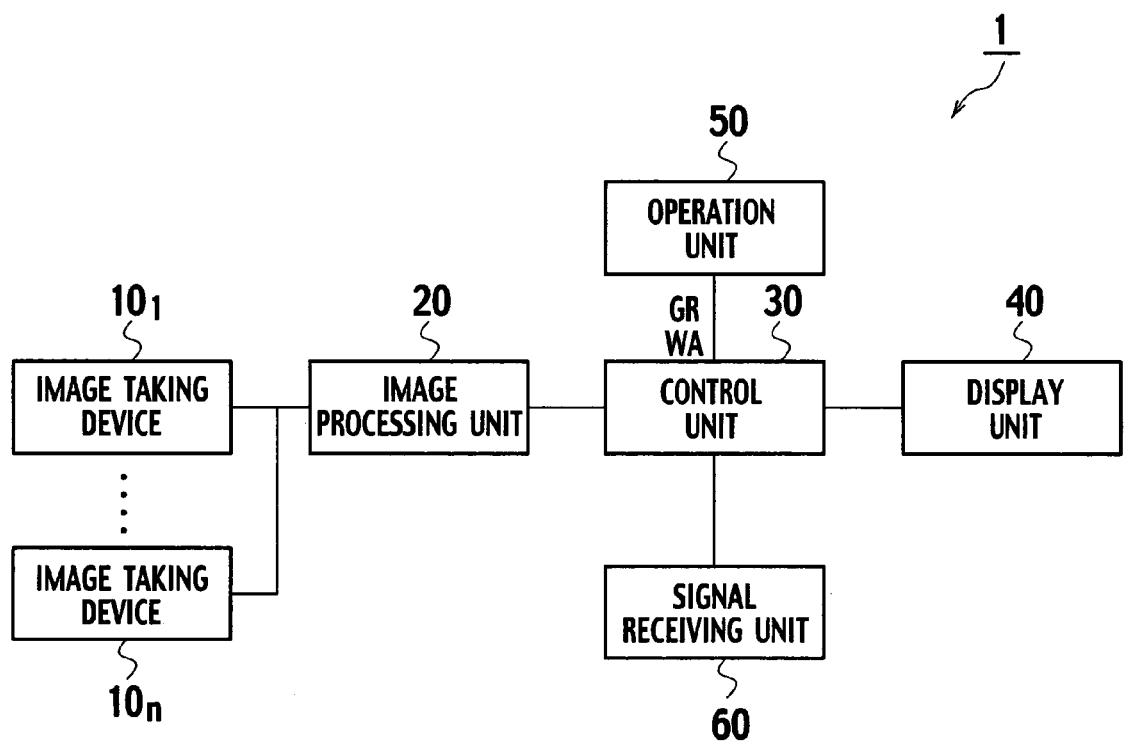
FIG. 1 is a block diagram of a driving support system according to an embodiment of the present invention.

An embodiment of the present invention will be explained below with reference to the drawings, wherein like members are designated by like reference characters.

As shown in FIG. 1, a driving support system 1 according to the present embodiment provides a driver of a host vehicle 101 with a virtual image of areas around the host vehicle 101 as viewed downward from a virtual viewpoint located above the host vehicle 101 (hereinafter referred to as "overhead view image").

The driving support system 1 includes a plurality of cameras (image taking devices) $10_1$ to $10_n$, an image processing unit 20, a control unit (determining unit) 30, a display unit 40, an operation unit 50, and a vehicle signal receiving unit 60.

A plurality of cameras $10_1$ to $10_n$ are oriented differently, to pick up images of different areas A1 to A4 around the host vehicle 101 and send data of the picked-up image to the image processing unit 20.

Figure 2:
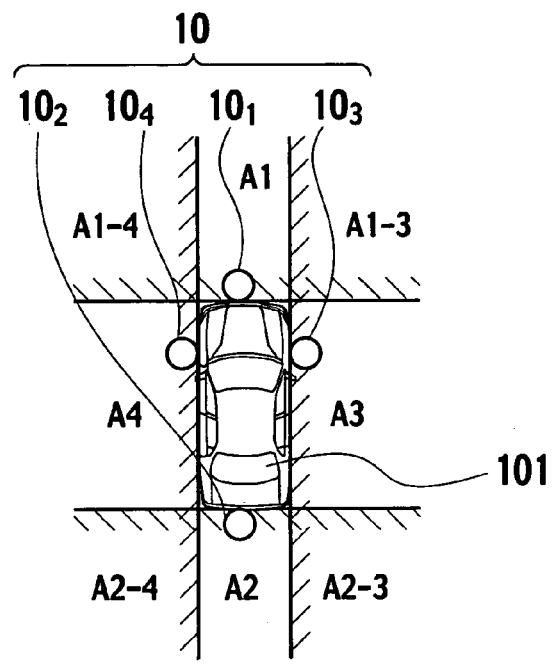
FIG. 2 shows an example of first to fourth cameras $10_1$ to $10_4$ provided as a plurality of cameras $10_1$ to $10_n$.

First to fourth cameras $10_1$ to $10_4$ are described below as an example of the plurality of cameras $10_1$ to $10_n$. As shown in FIG. 2, the first camera $10_1$ is provided at the front end of the host vehicle $10_1$ and oriented forward, the second camera $10_2$ is provided at the rear end of the vehicle 101 and oriented rearward, the third camera $10_3$ is provided at a right side mirror of the vehicle 101 and oriented rightward, and the fourth camera $10_4$ is provided at a left side mirror of the vehicle 101 and oriented leftward. The first to fourth cameras $10_1$ to $10_4$ are wide-angle cameras, each having an angle of view of 180 degrees. Ranges of field of view of the first to fourth cameras $10_1, 10_2, 10_3, 10_4$ correspond to an area A1 in front of the vehicle 101 including areas A1-4 and A1-3, an area A2 to the rear thereof including areas A2-4 and A2-3, an area A3 on the right side thereof including areas A1-3 and A2-3, and an area A4 on the left side thereof including areas A1-4 and A2-4, respectively. These four cameras thus take images over all the areas around the host vehicle 101.

Figure 3A:
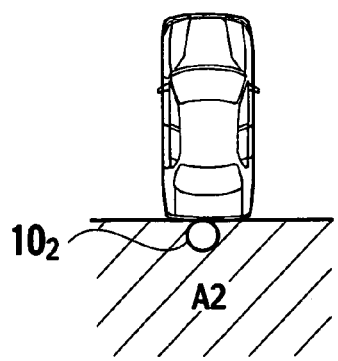
FIGS. 3A to 3C show ranges of field of view of the first to fourth cameras $10_1$ to $10_4$ shown in FIG. 2.
Figure 3B:
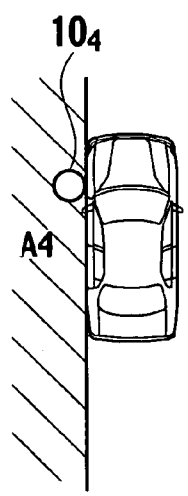
Figure 3C:
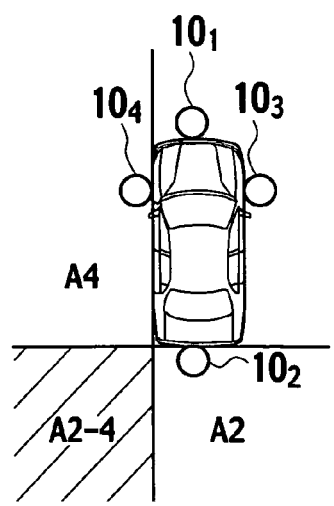

The ranges of field of view A1 to A4 partially overlap in the areas A1-4, A1-3, A2-4, and A2-3. For example, the range of field of view A2 of the second camera $10_2$ shown in FIG. 3A partially overlaps with the range of field of view A4 of the fourth camera $10_4$ shown in FIG. 3B as hatched area A2-4 in FIG. 3C on the left side and to the rear of the vehicle 101. Similarly, the range of field of view A1 of the first camera $10_1$ partially overlaps with the range of field of view A3 of the third camera $10_3$ at the area A1-3 on the left side and in front of the vehicle 101, the range of field of view A1 of the first camera $10_1$ partially overlaps with the range of field of view A4 of the fourth camera $10_4$ at the area A1-4 on the left side and in front of the vehicle 101, and the range of field of view A2 of the second camera $10_2$ partially overlaps with the range of field of view A3 of the third camera $10_3$ at the area A2-3 on the right side and to the rear of the vehicle 101.

The image processing unit 20 performs coordinate transformation on the images taken by the first to fourth cameras $10_1$ to $10_4$ from camera coordinate systems to a virtual viewpoint coordinate system to produce transformed images, and joins them to each other to produce a virtual image as viewed from a virtual viewpoint (an overhead view image in the present embodiment). Specifically, the image processing unit 20 performs coordinate transformation on pixel coordinates of the images picked up by the first to fourth cameras $10_1$ to $10_4$ with a road surface regarded as a reference plane. That is, the coordinate transformation is made so that at least a two-dimensional object lying on the road surface may have its continuity maintained at the joints of the transformed images. Then, the image processing unit 20 joins the four transformed images to one another. Here, the unit 20 has conversion tables each storing the corresponding relationships in pixel coordinates between the image taken by the camera and the transformed image for each of the first to four cameras $10_1$ to $10_4$, and is configured to perform the coordinate transformation on pixel coordinates of the images taken by the first to fourth cameras $10_1$ to $10_4$ using the respective conversion tables.

The control unit 30 controls the entire system 1. The control unit 30 sends overhead view image data produced in the image processing unit 20 to the display unit 40. The display unit 40 sequentially displays the overhead view images produced in the image processing unit 20 using the sent overhead view image data.

Figure 4:
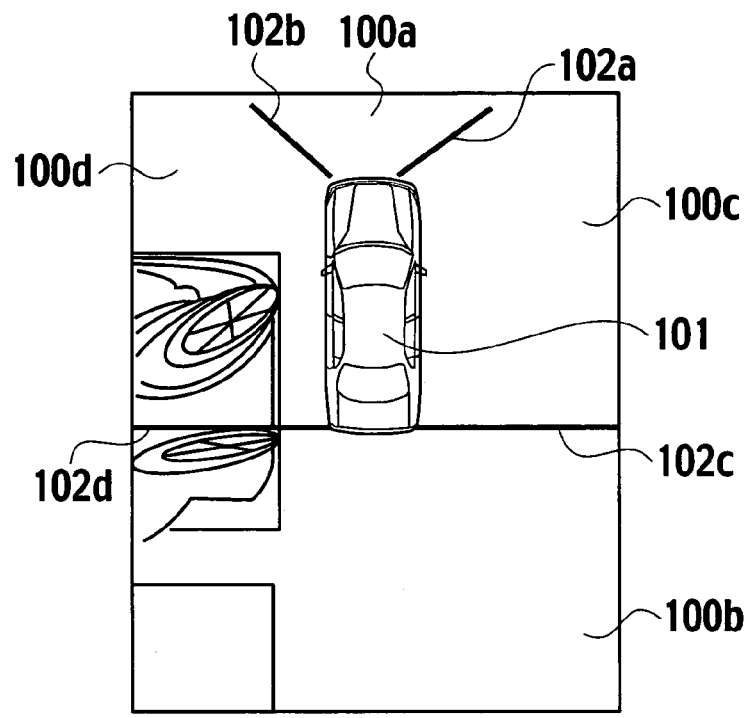
FIG. 4 shows an example of an overhead view image.

The overhead view image is produced by joining a transformed image TIa obtained by performing a coordinate-transformation on the images taken by the first camera $10_1$, a transformed image TIb obtained by performing a coordinate-transformation on the images taken by the second camera $10_2$, a transformed image TIc obtained by performing a coordinate-transformation on the images taken by the third camera $10_3$, and a transformed image TId obtained by performing a coordinate-transformation on the images taken by the fourth camera $10_4$ with one another. As shown in FIG. 4, the overhead view image consists of a first image area 100a corresponding to all or a part of the transformed image TIa, a second image area 100b corresponding to all or a part of the transformed image TIb, a third image area 100c corresponding to all or a part of the transformed image TIc, a fourth image area 100d corresponding to all or a part of the transformed image TId. In addition to that, computer graphics (CG) of the host vehicle 101 is synthesized at the center of the overhead view image, whereby a driver can objectively realize the position of the host vehicle relative to the surrounding objects.

The transformed images TIa to TId partially overlap in image areas corresponding to the overlapping areas A1-4, A1-3, A2-4 and A2-3 of the ranges of field of view of the cameras. More specifically, the transformed images TIa and TIc partially overlap at an image area corresponding to the overlapping area A1-3 of the ranges of field of view of the first camera $10_1$ and the third camera $10_3$. The transformed images TI-a and TI-d partially overlap at an image area corresponding to the overlapping area A1-4 of the ranges of field of view of the first camera $10_1$ and the fourth camera $10_4$. The transformed images TI-b and TI-c partially overlap at an image area corresponding to the overlapping area A2-3 of the ranges of field of view of the second camera 102 and the third camera 103. The transformed images TI-b and TI-d partially overlap at an image area corresponding to the overlapping area A2-4 of the ranges of field of view of the second camera $10_2$ and the fourth camera $10_4$.

Joints of the transformed images TIa to TId lie on the overlapping image areas. The joint of the transformed images TIa and TIc, or the joint of the first and third image areas 100a and 100c, lies within an image area corresponding to the overlapping area A1-3. Along the joint, a first masking line 102a is provided so as to lessen the driver's discomfort due to the discontinuous display image. Similarly, the joint of the transformed images TIa and TId, or the joint of the first and fourth image areas 100a and 100d, lies within an image area corresponding to the overlapping area A1-4, and a second masking line 102b is provided along the joint. The joint of the transformed images TIb and TIc, or the joint of the second and third image areas 100b and 100c, lies within an image area corresponding to the overlapping area A2-3, and a third masking line 102c is provided along the joint. The joint of the transformed images TIb and TId, or the joint of the second and fourth image areas 100b and 100d, lies within an image area corresponding to the overlapping area A2-4, and a fourth masking line 102d is provided along the joint. The first to fourth masking lines 102a to 102d are set to be about 10 to 20 centimeters in width in actual scale.

The operation unit 50 receives the operations of a steering wheel, a shift lever, and switches by the driver. Upon receiving the driver's operation, the operation unit 50 sends the signal corresponding to the operation to the control unit 30.

The vehicle signal receiving unit 60 collects signals indicating vehicle behavior by detecting a running speed, a number of revolutions of an engine, or others. The unit 60 is configured to send the collected signals to the control unit 30.

The control unit 30 functions as a detector for detecting driver's operations and vehicle behavior based upon signals from the operation unit 50 and the vehicle signal receiving unit 60. More specifically, when a gear range signal GR indicating selected gear range is inputted to the control unit 30, the unit 30 functions as a detector for detecting current shift lever position or selected gear range. When a steering signal WA indicating a steering wheel operation is inputted to the control unit 30, the unit 30 functions as a detector for detecting a steering angle or an operation amount of the steering wheel.

Figure 5:
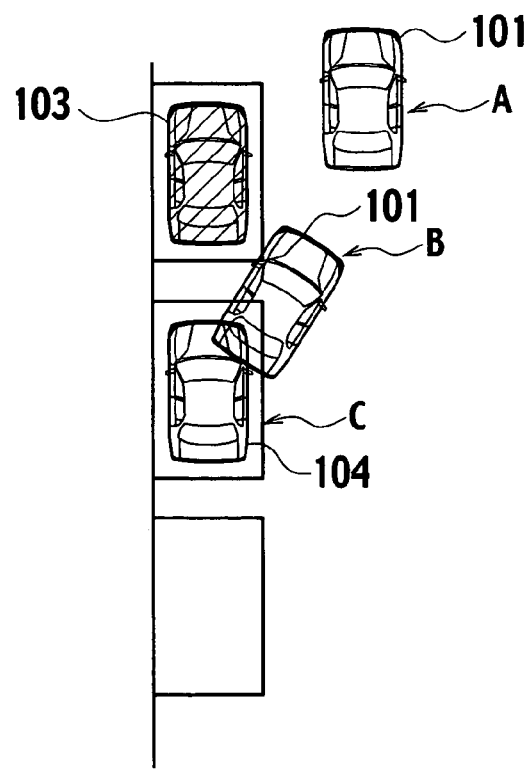
FIG. 5 shows a scene where a vehicle is being parked parallel to an edge of a street.

Described below is how the driving support system 1 according to the embodiment of the present invention works when the vehicle 101 is parked parallel. Suppose that a vehicle 103 has been parked at a parking space to the rear of which the host vehicle 101 is being parked tandem as shown in FIG. 5. In this situation, the vehicle 101 starts moving rearward at the position A on the right side of the parked vehicle 103, passes the position B on the right side and to the rear of the vehicle 103, and stops at the position C in another parking space.

In this parking process, the first to fourth cameras $10_1$ to $10_4$ take images of surrounding areas to the plural directions from the vehicle 101, and collect time series data of the taken images. The image processing unit 20 performs the coordinate transformation on the collected data and joins the transformed images to produce time series data of the overhead view image. The display unit 40 subsequently displays the produced overhead view images. Thereby, the driver can park the host vehicle while objectively looking around the vehicle.

Figure 6A:
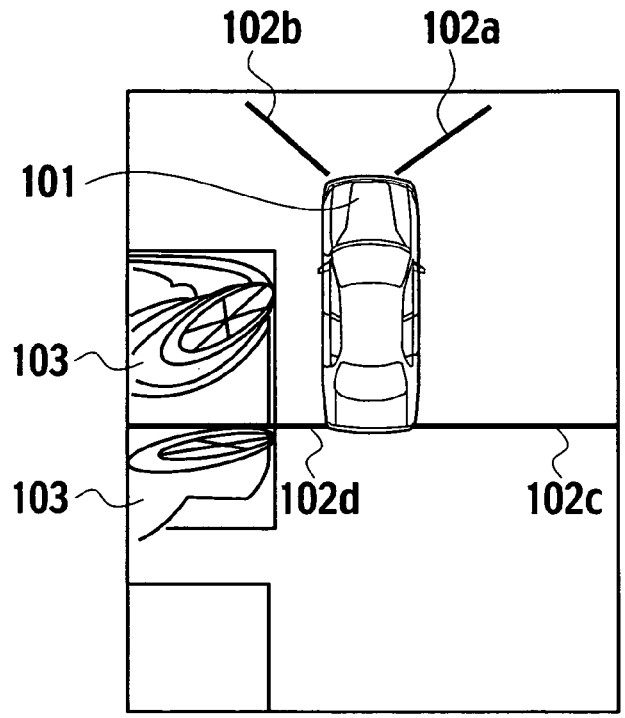
FIG. 6A shows one example of an overhead view image displayed when a vehicle is being parked parallel in FIG. 5.
Figure 6B:
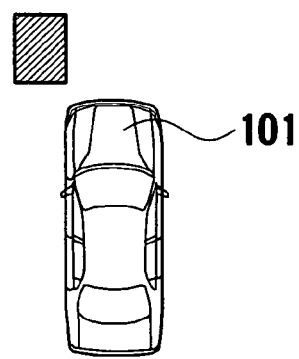
FIG. 6B shows a location of an object having disappeared from the overhead view image shown in FIG. 6A.

In the produced overhead view image, the parked vehicle 103 is now displayed discontinuously and divided into front and rear portions, as shown in FIG. 6A. The overhead view image shown in FIG. 6A therefore cannot allow the driver to realize intuitively the image displayed on the left side of his or her vehicle. Further, in spite of the fact that an object has lain on the front left of the vehicle, as shown in FIG. 6B, no object has been displayed on the overhead view image in FIG. 6A. Such disappearance of the object is caused by the characteristics of the coordinate transformation process that a three-dimensional object above the road surface gets squashed after it is subjected to the coordinate transformation, while a two-dimensional object lying on the road surface such as the marker line painted thereon is faithfully reproduced, or caused by camera misalignments of several centimeters. Since the first to fourth masking lines 102a to 102d are 10 to 20 centimeters in width in actual scale, if a small object measuring 10 to 20 centimeters in width lies around the vehicle, the object can be hidden by the first to fourth masking lines 102a to 102d.

For that reason, the driving support system 1 according to the present embodiment suppresses the aforementioned degradation of image quality attributed to the discontinuity at the joints of the overhead view image. More specifically, the image processing unit 20 of the driving support system 1 changes the positions of the joints of the transformed images in the current overhead view image from those of the joints in an overhead view image produced at a previous processing, joining the transformed images at joints different from the previous ones when producing the current overhead view image.

That is to say, the image processing unit 20 changes the positions of the first to fourth masking lines 102a to 102d in FIG. 6A to other positions different from those shown in FIG. 6A. At this juncture, the image processing unit 20 changes the positions of the first to fourth masking lines 102a to 102d within the transformed image areas corresponding to the overlapping areas A1-4, A1-3, A2-4, and A2-3. In other words, the image processing unit 20 can produce overhead view images using any of overlapping transformed images for the overlapping areas of field of view of the plural cameras 10. For this reason, the image processing unit 20 can change freely the positions of the joints within the overlapping areas of the transformed images.

Figure 7A:
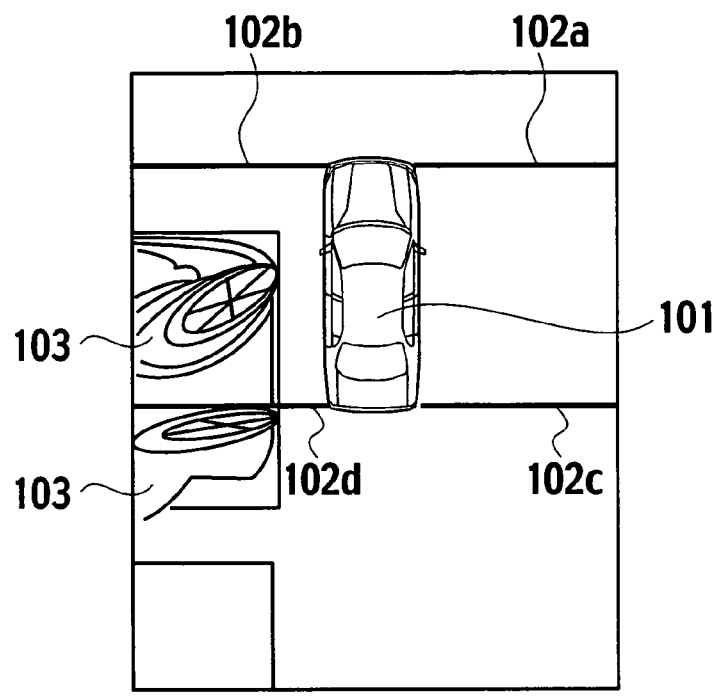
FIGS. 7A and 7B show overhead view images obtained before and after the positions of the joints of the transformed images (component images) are changed.

As an example, described below is how the positions of the first to fourth masking lines 102a to 102d shown in FIG. 7A are changed to those shown in FIG. 7B.

Before the positions of the masking lines are changed, the image of the parked vehicle 103 in a parking space on the left side of the host vehicle 101 is divided by the fourth masking line 102d provided along the joint between the second and fourth image areas 100b and 100d, and gets discontinuous as shown in FIG. 7A, which makes it difficult for the driver of the host vehicle 101 to recognize intuitively an image displayed on the left side thereof.

Figure 7B:
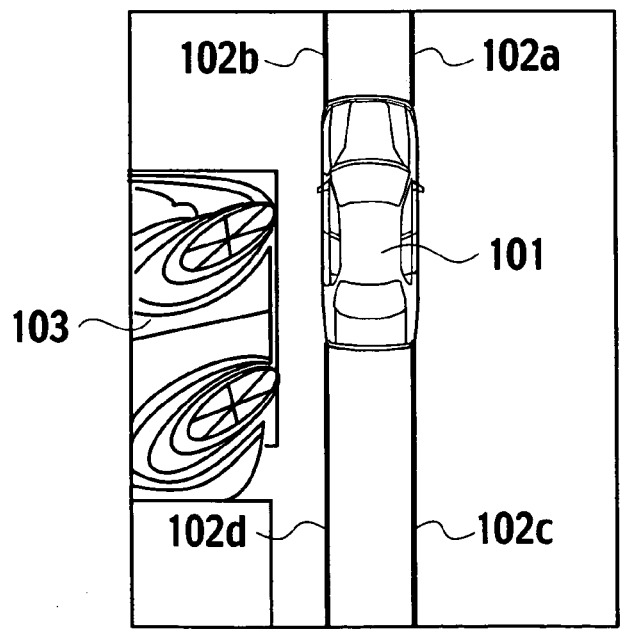

However, when the positions of the first to fourth masking lines 102a to 102d are changed as shown in FIG. 7B, the fourth line 102d does not divide the parked vehicle 103 and keeps its continuity. The driver of the host vehicle 101 therefore can recognize it as a vehicle at a glance through the display unit 40.

Thus, in the present embodiment, the display unit 40 displays overhead view images in which the positions of the first to fourth masking lines 102a to 102d are changed, whereby objects around the vehicle 101 are made free from being kept disappearing or discontinuous at the joints. This can suppress the degradation in image quality resulting from the inappropriate joints.

Here, the image processing unit 20 is configured to change the positions of the joints by receiving driver's input into the operation unit 50, i.e., by his or her switching operation, wherein one switch operation changes the positions of the joints once.

On the other hand, the positions of the joints may be changed sequentially as shown in FIG. 8A without regard to the driver's operation. In that case, the image processing unit 20 first produces an overhead view image shown in FIG. 8A. Then, the unit 20 simultaneously moves the masking lines 102a to 102d in the direction of the arrows a in the figure to produce the overhead view image shown in FIG. 8B. In sequence, the unit 20 further moves the masking lines 102a to 102d in the direction of the arrows a to produce the overhead view image shown in FIG. 8C. In the similar manner, the unit 20 will then produce the overhead view images shown in FIGS. 8D and 8E.

The image processing unit 20 subsequently moves the masking lines 102a to 102d in the direction of the arrows β to produce the overhead view image shown in FIG. 8D after producing the overhead view image shown in FIG. 8E. After that, the unit 20 sequentially produces the overhead view images shown in FIGS. 8A to 8C. In that way, the image processing unit 20 continuously changes the positions of the joints between images, or those of the masking lines 102a to 102d.

Continuous change of the positions of the joints eliminates the necessity for the driver to perform an operation to change the positions of the joints such as a switching operation, which further facilitates smooth parking.

The image processing unit 20 may be adapted to change the positions of the joints between images according to vehicle behavior. That is to say, the image processing unit 20 may be adapted to change the positions of the joints while the host vehicle 101 is not being reversed, and stop changing the positions of the joints while the host vehicle 101 is being reversed.

The control unit 30 determines whether the vehicle moves rearward or not from, for example, signals related to operations received by the operation unit 50 and from signals related to vehicle behavior collected by the vehicle signal receiving unit 60. When the control unit 30 determines that the vehicle has moved rearward, the image processing unit 20 will stop changing the positions of the joints between images. In the case of the host vehicle 101 equipped with an automatic transmission, the control unit 30 determines that the vehicle 101 is moving rearward when the parking brake is released with the shift lever thereof positioned at Reverse "R", and stops changing the positions of the joints. Alternatively, the driving support system 1 may be configured to detect the running speed to determine whether the vehicle is reversed, to thereby stop changing the positions of the joints between images.

The system 1 thus suitably supports a driver by stopping changing the positions of the joints when the vehicle is being reversed and by changing the positions of the joints while the vehicle is not being reversed, for example, stopped. In general, the driver temporarily stops moving his/her vehicle when foreseeing that there is an object in the area around the vehicle while parking it. While the vehicle is being stopped, the system 1 changes the positions of the joints so that the driver can check the area around the vehicle through the displayed image of the system 1. When the driver starts again reversing the vehicle after the checking is done, high level of visibility can be maintained because the system 1 keeps the positions of the joints between images.

In the embodiment described above, changing the positions of the joints between images depends upon whether the vehicle is being reversed, however, it does not always depend on that. The image processing unit 20 may be adapted to determine whether it should stop changing the positions of the joints between images from the pixel data of the produced overhead view image, even when the vehicle is not being reversed, and to stop changing the positions of the joints between images when the unit 20 determines that it should stop changing.

Figure 9C:
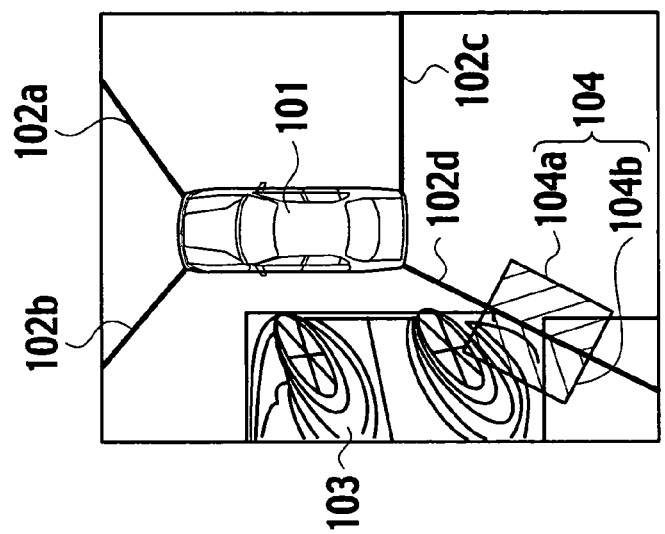
FIG. 9A to 9C explain a process to determine based on pixel data in overhead view images whether to stop changing the positions of the joints of transformed images.
Figure 9B:
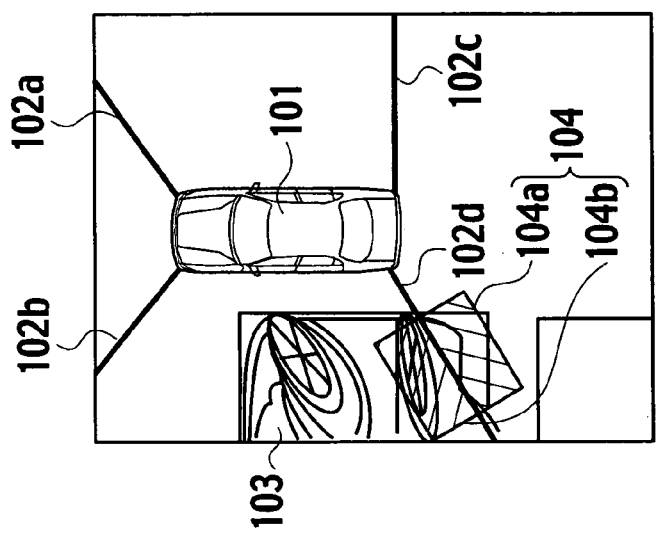
Figure 9A:
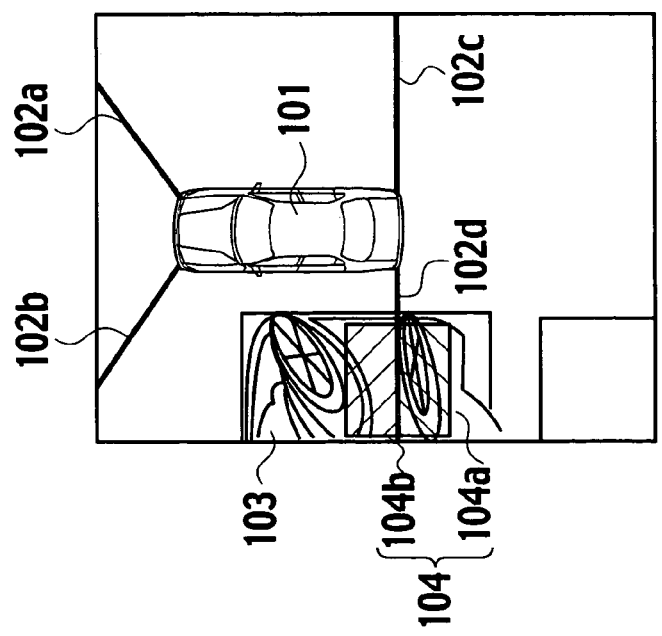

According to FIGS. 9A to 9C is described below how to determine from pixel data of the overhead view image whether the image processing unit 20 should stop changing the positions of the joints between images.

Before the image processing unit 20 determines whether it should stop changing the positions of the joints between images, the unit 20 firstly sets a plurality of determining areas 104 extending over the first to fourth masking lines 102a to 102d in the produced overhead view image. Let us suppose that the determining area 104 is now set only on the fourth masking line 102d as shown in FIG. 9A to simplify the description.

The determining area 104 consists of a first determining area 104a set in one image area on one side of the joint and bordered by the joint and a second determining area 104b set in the other image area on the other side of the joint and bordered by the joint.

The image processing unit 20 finds the mode, or the most frequent value, of color values in the aforementioned one and the other areas, respectively. In other words, the image processing unit 20 determines which color value is the largest in number in the pixel data in the first determining area 104a. More specifically, the image processing unit 20 identifies that each pixel in the first determining area 104a corresponds to which color value, for example, in 256 grayscales, and then determines the color value being the largest in number therein. Similarly, the image processing unit 20 determines which color value is the largest in number in pixel data in the second determining area 104b.

If the fourth masking line 102d overlaps with a parked vehicle 103 or something, the modes of color values of the pixels in both the first and second determining areas 104a and 104b will be equal to each other. That is to say, since one object lies across the first and second determining areas 104a and 104b separated by the fourth masking line 102d, a specific and common color value is detected most frequently in these areas. Thus, if the same color value is detected to be the largest in number at both the first and second determining areas 104a and 104b, or if the modes of color values of the pixels are equal to each other in the areas, the image processing unit 20 determines that it should change the position of the joint of the images in order that the driver can recognize objects with ease.

Then the image processing unit 20 changes the position of the joint of images to that in FIG. 9B. At this stage, the fourth masking line 102d still overlaps with the parked vehicle 103. Therefore, the same color value is detected to be the largest in number at both the first and second determining areas 104a and 104b, or the modes of color values of the pixels are equal to each other in these areas, whereby the image processing unit 20 determines that it should change the position of the joint of the images.

After that, the image processing unit 20 changes the position of the joint of the images to that in FIG. 9C. The fourth masking line 102d is now off the parked vehicle 103 without overlapping therewith in the displayed image. At this moment, most frequently detected color values at both the first and second determining areas 104a and 104b are different from each other, in other words, the modes of color values of the pixels in both the first and second determining areas 104a and 104b becomes different from each other, whereby the image processing unit 20 determines that the fourth masking line 102d does not overlap with the parked vehicle 103 and then stops changing the position of the joint of the images.

To sum up, the image processing unit 20 continues moving the positions of the joints between the images while determining the modes of color values of the pixels in each of the first and second determining areas 104a and 104b. When the modes of color values of the pixels in respective first and second determining areas 104a and 104b become different, the image processing unit 20 determines that it should stop changing the position of the joints of the images. Thus, the system 1 can produce and display appropriate overhead view images matched with environment around the vehicle without any help of the driver by virtue of automatic change of the position of the joint of the images and automatic stop of the change thereof.

Figure 10A:
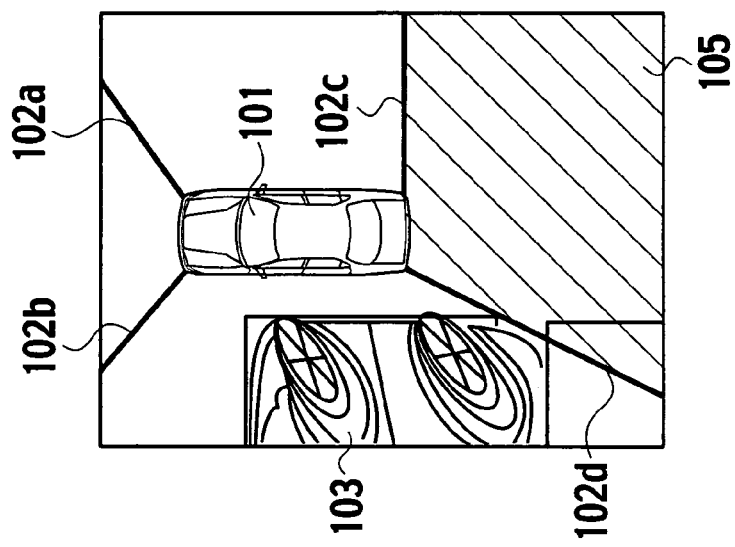
FIG. 10A to 10C explain a second process to determine based on pixel data in overhead view images whether to stop changing the positions of the joints of transformed images.

With respect to automatic change of the position of the joints of the images and automatic stop of the change thereof, whether to change the position of the joints of the images or stop changing them does not always depend on the case shown in FIGS. 9A to 9C. In the examples shown in FIGS. 10A to 10C, the image processing unit 20 uses one area bordered by the joint of the images as a determining area 105 for determining whether it should stop changing the position of the joint of the images. For simplifying the following description, one area bordered by the fourth masking line 102d, or an area to the rear of the vehicle bordered by the fourth and third masking lines 102d and 102c (hatched portion in FIGS. 10A to 10C) is used as a determining area 105.

The image processing unit 20 first finds the mode of color values of the pixels in the determining area 105. In other words, the unit 20 determines which color value is the largest in number in pixel data in the determining area 105. In the example shown in FIG. 10A, the road surface accounts for a majority of the determining area 105. This means that the image processing unit 20 determines the mode of color values of the pixels in the determining area 105 is the color of the road surface. In addition, the image processing unit 20 computes percentage of pixels with color value of the mode of color values relative to the whole determining area 105, i.e., percentage of pixels with color value of the mode of color values with respect to the total number of pixels in the determining area 105.

Figure 10B:
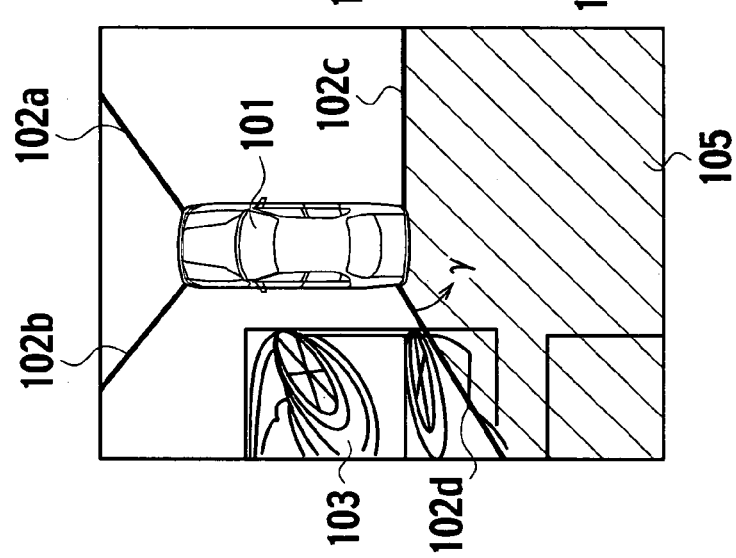

Then, the image processing unit 20 changes the position of the joint of the images as shown in FIG. 10B. In the example shown in FIG. 10A, the fourth masking line 102d overlaps with the parked vehicle 103, the rear portion of which is included in the determining area 105. According as the fourth masking line 102d moves in the direction y, i.e., counterclockwise in the figure, the vehicle 103 is leaving the area 105, which increases percentage of pixels with color value of the mode of color values (color of the road surface) in the area 105. That is to say, the image processing unit 20 continues moving the position of the joint, and when the percentage of pixels with color value of the mode of color values increases in one area bordered by the joint, the image processing unit 20 estimates that the joint overlaps on an object and then determines that it should change the position of the joint.

Figure 10C:
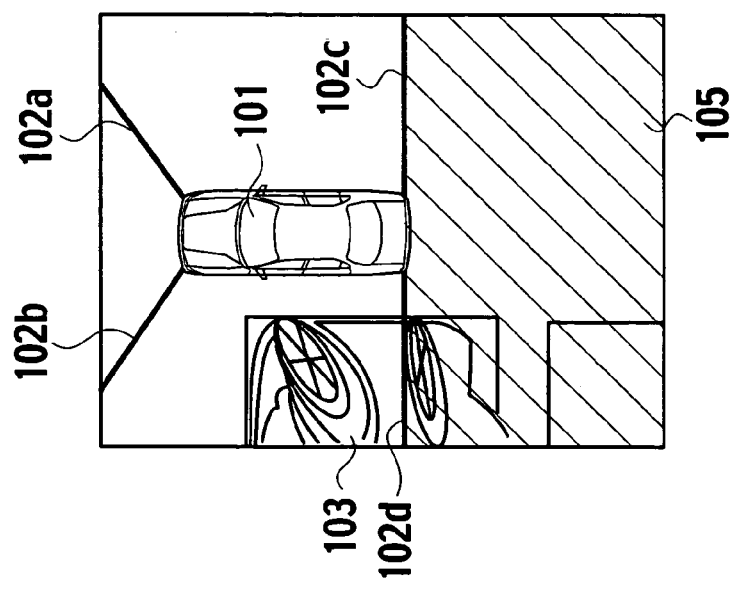

After that, as shown in FIG. 10C, let us suppose that the image processing unit 20 moves the position of the joint of the images to a position where the fourth line 102d does not overlap with the parked vehicle 103. In this stage, even if the line 102d is further moved in the direction γ, the percentage of pixels with color value of the mode of color values in the area 105 will not increase. The image processing unit 20 then determines that the fourth line 102d does not overlap with the vehicle 103 and stops changing the position of the joint of the images.

As mentioned above, while finding the mode of color values of the pixels in the determining area 105 which is on one side of and bordered by the joint of the images, the image processing unit 20 computes percentage of pixels with color value of the mode of color values with respect to the total number of pixels in the whole determining area 105, continues moving the joint of the images as long as the percentage increases, and determines that it should stop changing the position of the joint when the percentage stops increasing. Thereby the system 1 can display appropriate overhead view images matched with environment around the vehicle by automatically changing the position of the joint of the images and stopping changing the position thereof.

A modified embodiment of the driving support system 1 is described below with reference to FIG. 11. The driving support system 1 related to the modified embodiment is equipped with a plurality of obstacle detecting sensors $70_1$ to $70_n$ and configured to change the position of only a part of joints between plural images.

Figure 11:
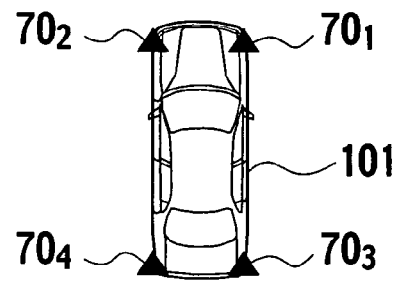
FIG. 11 shows a modified example of a driving support system according to the present embodiment.

FIG. 11 shows the system 1 having four obstacle detecting sensors $70_1$ to $70_4$ as examples of a plurality of obstacle detecting sensors $70_1$ to $70_n$. A first obstacle detecting sensor $70_1$ is fixed to the right front corner of the vehicle 101 and a second obstacle detecting sensor $70_2$ is fixed to the left front corner of the vehicle 101. A third obstacle detecting sensor $70_3$ is fixed to the right rear corner of the vehicle 101 and a fourth obstacle detecting sensor $70_4$ is fixed to the left rear corner of the vehicle 101. These four obstacle detecting sensors detect objects close to the respective corners of the vehicle.

Figure 12:
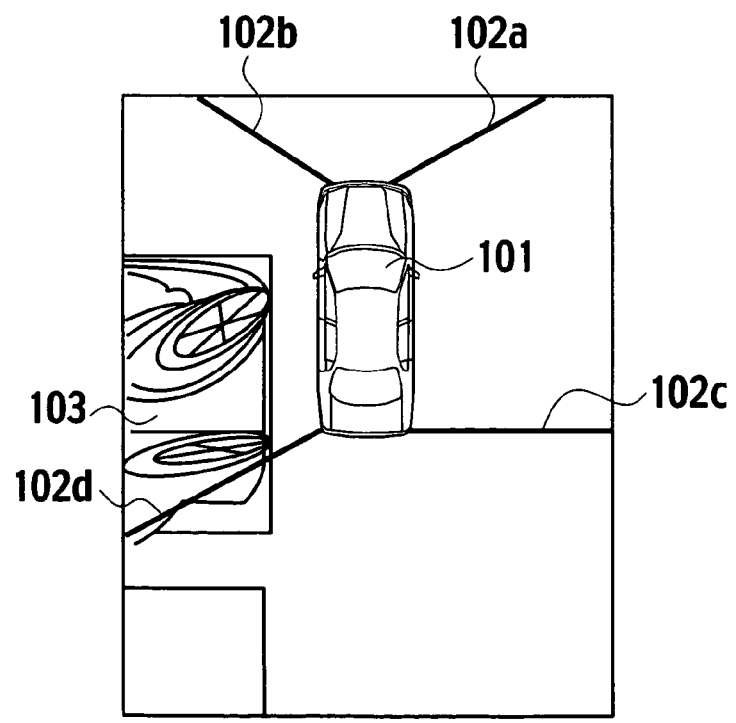
FIG. 12 shows the operation of the driving support system according to the modified example.

The driving support system 1 related to the modified embodiment changes the position of only the joint of images lying in the area in the direction where there is an object close to the vehicle 101. In an example shown in FIG. 12, the parked vehicle 103 is close to the left side of the vehicle 101, especially to the left rear corner of the vehicle 101. When the fourth obstacle detecting sensor $70_4$ detects the parked vehicle 103, the image processing unit 20 changes the position of only the fourth masking line 102d located in the direction where the obstacle exists. This means that the system 1 changes the position of the joint of the images only in the direction significant in safety terms, which further improves a processing speed of the whole system as compared to the case where the positions of all joints are changed.

The aforementioned modified embodiment determines the direction where the positions of the joint of the images are changed based upon the information from a plurality of obstacle detecting sensors $70_1$ to $70_4$. A criterion for selecting a joint to be moved does not necessarily depend on the information from the obstacle detecting sensors $70_1$ to $70_4$, and alternatively a joint of images to be moved may be selected according to driver's operations to a shift lever or a steering wheel.

As shown in FIG. 1, the control unit 30 determines, for example, a direction of movement of the vehicle 101 in the longitudinal direction thereof by receiving a gear range signal GR indicating selected gear range. The image processing unit 20 changes the positions of the joints between the images lying forward in the determined direction of movement.

Alternatively, the control unit 30 determines a direction of movement of the vehicle 101 in the transverse direction thereof by receiving a steering signal WA indicating a steering operation. The image processing unit 20 changes the position of the joint of the images lying forward in the determined direction of movement.

The positions of the joints lying forward in the directions other than the direction of movement of the vehicle, i.e., the directions where the vehicle will not touch objects lying in the areas in the directions, will not be changed, whereby the overhead view image provides the driver with accurate and necessary information.

The image processing unit 20 in the present embodiment changes the positions of the joints in joining the images subjected to coordinate transformation to produce the overhead view images, to the positions different from those of the joints of overhead view images produced by the previous process. In other words, each joint of the transformed images in an overhead view image does not continue existing at a fixed position. For this reason, an object will neither be discontinuously displayed at the joints nor kept disappearing. Consequently, it is possible to suppress degradation of image quality attributed to the inappropriate joints of images.

In addition to the above, the system is designed to change continuously the positions of joints between the images independently of driver's operations for changing the positions of joints. That does not require driver's switch operations any longer, making parking smoother.

Furthermore, the system 1 is designed to change the positions of joints between the images while the vehicle is not being reversed, and stop changing the positions thereof while the vehicle being reversed. In general, a driver temporarily stops moving his/her vehicle when foreseeing that there is an object around the vehicle while parking the vehicle. At that stage, the system 1 changes the positions of the joints of the images, whereby the driver can make sure of his or her forecast. The system 1 therefore allows the driver to make sure of surroundings around the vehicle by repeating stop and reverse when he or she feels uneasy about the surroundings. Moreover the system 1 does not change needlessly the positions of the joints of the images, which improves visibility. Accordingly, the system 1 suitably helps the driver park.

Even while the vehicle is not being reversed, the system 1 determines from pixel data in the produced overhead view image whether it should stop changing the positions of the joints. When determining that the system should stop changing, it stops changing the positions of the joints. More concretely, the mode of color values of the pixels is found in the first and second determining areas 104a and 104b bordered by the joint and at the same time the position of the joint continues to be moved. At the moment when the mode of color values of the pixels in respective areas 104a and 104b are different from each other, the system determines that it should stop changing the positions of the joints. Still further, while the mode of color values of the pixels is being found in the determining areas 105 bordered by the joint, percentage of pixels with color value of the mode of color values with respect to the total number of pixels in the whole determining area 105 is determined. The position of the joint continues to be moved until the percentage stops increasing. At that point, the system determines that it should stop changing the position of the joint.

As a result of that, while the vehicle is not being reversed, the system automatically changes the positions of the joints and automatically stops changing the positions of the joints as well. Consequently, the system can display appropriate overhead view images matched with environment around the vehicle without any trouble for the driver.

Still furthermore, when there are a plurality of joints, the system 1 changes the positions of a part of the plurality of joints. That can increase the processing speed of the system as a whole as compared to the case where the positions of all joints are changed.

Still further, the system 1 determines the direction of movement of the vehicle in the longitudinal direction thereof by receiving the gear range signal GR indicating the selected gear range and then changes the position of the joint of the images lying forward in the determined direction of movement. The direction of movement of the vehicle in the transverse direction thereof is determined by receiving the steering signal WA indicating the steering operation and then changes the position of the joint of the images lying forward in the determined direction of movement. As stated above, by determining the direction of movement of the vehicle and changing the position of the joint lying forward in that direction, the position of the joint in a direction where the vehicle may touch a surrounding object is changed. On the other hand, the system does not change the positions of the joints in the directions other than the direction of movement of the vehicle, that is to say, in the directions where the vehicle will not touch surrounding objects. This means that the position of only the joint in a required direction is changed, enabling appropriate overhead view images to be displayed.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-309590, filed on Oct. 25, 2004, the disclosure of which is expressly incorporated herein by reference in its entirety.

What is claimed is:

1. A driving support system comprising:
    a plurality of image taking devices configured to take images of areas around a vehicle, wherein the image taking devices have ranges of field of view that partially overlap with each other;
    an image processing unit configured to perform a predetermined coordinate transformation on the images taken by the image taking devices to produce transformed images and to join the transformed images to each other at a joint to produce a virtual image viewed from a virtual viewpoint, wherein the image processing unit is configured to continuously change a position of the joint relative to the transformed images in the virtual image and to stop changing the position of the joint, based on pixel data of the produced virtual image; and
    a display unit configured to display the virtual image.

2. The driving support system according to claim 1, wherein the image processing unit is configured to continuously change the position of the joint independently of a driver's operation.

3. A driving support system, comprising:
    a plurality of image taking devices configured to take images of areas around a vehicle, wherein the image taking devices have ranges of field of view that partially overlap with each other;
    an image processing unit configured to perform a predetermined coordinate transformation on the images taken by the image taking devices to produce transformed images and to join the transformed images to each other at a joint to produce a virtual image viewed from a virtual viewpoint, wherein the image processing unit is configured to continuously change a position of the joint relative to the transformed images in the virtual image; and
    a display unit configured to display the virtual image,
    wherein the image processing unit is configured to continuously change the position of the joint while the vehicle is not in a reverse mode, and to stop changing the position of the joint while the vehicle is in the reverse mode.

4. The driving support system according to claim 3, further comprising a determining unit configured to determine whether the vehicle is being reversed by detecting a driver's operation or vehicle behavior, wherein the image processing unit is configured to stop changing the position of the joint when the determining unit determines that the vehicle is in the reverse mode.

5. The driving support system according to claim 3, wherein the image processing unit is configured to determine, based on pixel data of the produced virtual image, whether to stop changing the position of the joint, and to stop changing the position of the joint while a determination of whether to stop is being made even while the vehicle is not in the reverse mode.

6. The driving support system according to claim 5, wherein the image processing unit is configured to determine modes of color values of pixels in predetermined areas of the virtual image, which are provided on both sides of the joint and bordered by the joint, while changing the position of the joint, and to determine to stop changing the position of the joint at a moment when the modes of color values of the pixels in respective areas become different from each other.

7. A driving support system, comprising:
a plurality of image taking devices configured to take images of areas around a vehicle, wherein the image taking devices have ranges of field of view that partially overlap with each other;
an image processing unit configured to perform a predetermined coordinate transformation on the images taken by the image taking devices to produce transformed images and to join the transformed images to each other at a joint to produce a virtual image viewed from a virtual viewpoint, wherein the image processing unit is configured to change a position of the joint in the virtual image; and
a display unit configured to display the virtual image;
wherein the image processing unit is configured to continuously change the position of the joint while the vehicle is not in a reverse mode, and to stop changing the position of the joint while the vehicle is in the reverse mode;
wherein the image processing unit is configured to determine, based on pixel data of the produced virtual image, whether to stop changing the position of the joint, and to stop changing the position of the joint while a determination of whether to stop is being made even while the vehicle is not in the reverse mode;
wherein the image processing unit is configured to determine mode of color values of pixels in a predetermined area of the virtual image bordered by the joint, and to compute percentage of pixels with color value of the mode of color values with respect to a total number of pixels in the predetermined area, while changing the position of the joint, and to determine to stop changing the position of the joint at a moment when the percentage stops increasing.

8. The driving support system according to claim 1, wherein, when the virtual image includes a plurality of joints, the image processing unit is configured to change the position of only a part of the joints.

9. The driving support system according to claim 8, further comprising a determining unit configured to determine a direction of movement of the vehicle in a longitudinal direction thereof by receiving a gear range signal indicating a selected gear range, wherein the image processing unit is configured to change the position of the joint lying forward in the direction of movement determined by the determining unit.

10. The driving support system according to claim 8, further comprising a determining unit configured to determine a direction of movement of the vehicle in a transverse direction thereof by receiving a steering signal indicating a steering-wheel operation, wherein the image processing unit is configured to change the position of the joint lying forward in the direction of movement determined by the determining unit.

11. A method of producing a virtual image to be displayed in a driving support system, comprising:
taking images of areas around a vehicle partially overlapping with each other;
performing a predetermined coordinate transformation on the taken images to produce transformed images;
joining the transformed images together at a joint to produce a virtual image viewed from a virtual viewpoint; and
continuously changing a position of the joint relative to the transformed images in the virtual image and stopping changing the position of the joint, based on pixel data of the produced virtual image.

12. A driving support system comprising:
a plurality of image taking means for taking images of areas around a vehicle, wherein the image taking means have ranges of field of view that partially overlap with each other;
image processing means for performing a predetermined coordinate transformation on the images taken by the image taking means to produce transformed images and joining the transformed images to each other at a joint to produce a virtual image viewed from a virtual viewpoint, wherein the image processing means continuously changes a position of the joint relative to the transformed images in the virtual image and stops changing the position of the joint, based on pixel data of the produced virtual image; and
display means for displaying the virtual image.

13. A driving support system, comprising:
a plurality of image taking devices configured to take images of areas around a vehicle, wherein the image taking devices have ranges of field of view that partially overlap with each other;
an image processing unit configured to perform a predetermined coordinate transformation on the images taken by the image taking devices to produce transformed images and to join the transformed images to each other at a joint to produce a virtual image viewed from a virtual viewpoint, wherein the image processing unit is configured to continuously change a position of the joint relative to the transformed images in the virtual image; and
a display unit configured to display the virtual image;
wherein the position of the joint relative to the transformed images in the virtual image is changed in a continuous manner without a driver's operation to initiate the continuous change of the joint position.

14. A method of producing a virtual image to be displayed in a driving support system, comprising:
taking images of areas around a vehicle partially overlapping with each other;
performing a predetermined coordinate transformation on the taken images to produce transformed images;
joining the transformed images together at a joint to produce a virtual image viewed from a virtual viewpoint;
continuously changing a position of the joint relative to the transformed images in the virtual image; and
changing position of the joint relative to the transformed images in the virtual image in a continuous manner without a driver's operation to initiate the continuous change of the joint position.

15. A driving support system comprising:
a plurality of image taking means for taking images of areas around a vehicle, wherein the image taking means have ranges of field of view that partially overlap with each other;
image processing means for performing a predetermined coordinate transformation on the images taken by the image taking means to produce transformed images and joining the transformed images to each other at a joint to produce a virtual image viewed from a virtual viewpoint, wherein the image processing means continuously changes a position of the joint relative to the transformed images in the virtual image; and
display means for displaying the virtual image;
wherein the image processing means is configured to change position of the joint relative to the transformed images in the virtual image in a continuous manner without a driver's operation to initiate the continuous change of the joint position.

* * * * *